United States Patent
Park et al.

(10) Patent No.: US 8,520,751 B2
(45) Date of Patent: Aug. 27, 2013

(54) CHANNEL ESTIMATION APPARATUS AND METHOD USING LINEAR/NONLINEAR AVERAGE IN WIRELESS TELECOMMUNICATION SYSTEM

(75) Inventors: Sung-Ik Park, Daejon (KR); Hyoung-Soo Lim, Daejon (KR); Heung-Mook Kim, Daejon (KR); Jong-Soo Lim, Daejon (KR); Soo-In Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 830 days.

(21) Appl. No.: 12/514,121

(22) PCT Filed: Oct. 20, 2007

(86) PCT No.: PCT/KR2007/005366
§ 371 (c)(1),
(2), (4) Date: May 8, 2009

(87) PCT Pub. No.: WO2008/056902
PCT Pub. Date: May 15, 2008

(65) Prior Publication Data
US 2010/0061471 A1    Mar. 11, 2010

(30) Foreign Application Priority Data
Nov. 9, 2006 (KR) .................. 10-2006-0110693
Dec. 8, 2006 (KR) .................. 10-2006-0125142

(51) Int. Cl.
*H04L 27/28* (2006.01)
*H04B 15/00* (2006.01)

(52) U.S. Cl.
USPC ....................................................... 375/260

(58) Field of Classification Search
USPC .................... 375/259, 260, 229, 346, 316
See application file for complete search history.

(56) References Cited

U.S. PATENT DOCUMENTS

| 6,377,632 B1 * | 4/2002 | Paulraj et al. | 375/299 |
| 2005/0286406 A1 * | 12/2005 | Jeon et al. | 370/208 |
| 2006/0153144 A1 | 7/2006 | Kwun et al. | |
| 2008/0109701 A1 * | 5/2008 | Yu et al. | 714/760 |

FOREIGN PATENT DOCUMENTS

| KR | 1997-0707651 | 12/1997 |
| KR | 2002-0056986 | 7/2002 |

(Continued)

OTHER PUBLICATIONS

European Search Report and Written Opinion of the International Searching Authority mailed Feb. 5, 2009 in corresponding International Patent Application PCT/KR2007/005366.

(Continued)

*Primary Examiner* — Kevin M Burd
(74) *Attorney, Agent, or Firm* — Staas & Halsey LLP (57) ABSTRACT

Provided is a channel estimation apparatus and method using a linear/nonlinear average in a wireless communication system. The present research provides a channel estimation apparatus and method for estimating a channel between a transmitter and a receiver from a pilot-inserted OFDM signal and linearly or nonlinearly averaging the estimating channel, thereby preventing the equalizer performance from being degraded by noise component of the estimated channel and noise amplification caused by deep fading. The channel estimation apparatus includes: a channel estimation unit configured to estimate a channel coefficient of a channel between a transmitter and a receiver from a pilot-inserted carrier signal according to pilot arrangement; and a linear/nonlinear averaging unit configured to linearly or nonlinearly averaging the estimated channel coefficient, thereby preventing an equalizer performance from being degraded by noise component existing in the channel and noise amplification caused by deep fading.

11 Claims, 9 Drawing Sheets

(56) References Cited

FOREIGN PATENT DOCUMENTS

| KR | 10-0535638 | 12/2005 |
| WO | WO03/034644 | 4/2003 |
| WO | WO2004/028021 | 4/2004 |

OTHER PUBLICATIONS

Sung Ik Park et al., "Channel Estimation based on the Weighted Moving Average in T-DMB Receivers", Conference held by the Korean Society of Broadcast Engineering, Nov. 10, 2006.

\* cited by examiner

CHANNEL ESTIMATION APPARATUS AND METHOD USING LINEAR/NONLINEAR AVERAGE IN WIRELESS TELECOMMUNICATION SYSTEM

CROSS REFERENCE TO RELATED APPLICATIONS

This application claims the benefit of International Application No. PCT/KR2007/005366, filed Oct. 20, 2007, Korean Application No. 10-2006-0110693, filed Nov. 9, 2006, and Korean Application No. 10-2006-0125142, filed Dec. 8, 2006, the disclosures of all of which are incorporated herein by reference.

TECHNICAL FIELD

The present invention relates to a channel estimation apparatus and method using a linear/nonlinear average in a wireless communication system; and, more particularly, to a channel estimation apparatus and method for estimating a channel between a transmitter and a receiver from a pilot-inserted Orthogonal Frequency Division Multiplexing (OFDM) signal and linearly or nonlinearly averaging the estimating channel, thereby preventing the equalizer performance from being degraded by noise component of the estimated channel and noise amplification caused by deep fading.

This work was supported by the Information Technology (IT) research and development program of the Korean Ministry of Information and Communication (MIC) and/or the Korean Institute for Information Technology Advancement (IITA) [2006-S-016-01, "Development of Distributed Translator Technology for Terrestrial DTV"].

BACKGROUND ART

Due to strong multipath, there are limitations in implementing terrestrial digital transmission system requiring a high data rate. Also, it is difficult to transmit data at a high speed due to time dispersion of a channel. As a data rate becomes higher, inter-symbol interference (ISI) increases and a signal distortion and signal-to-noise ratio (SNR) of a channel are degraded, causing limitation in the amount of information to be transmitted over a transmission bandwidth of the channel. To overcome these limitations, an OFDM scheme was proposed. The OFDM scheme is a multi carrier modulation scheme that transmits data using a large number of subcarriers. Specifically, European Digital Video Broadcasting-Terrestrial (DVB-T) standard and Korean Terrestrial Digital Multimedia Broadcasting (T-DMB) standard adopted the OFDM modulation scheme and are used in digital audio broadcasting, satellite broadcasting, high-speed wireless LAN, mobile communications, and so on.

A T-DMB system is based on a Eureka-147 Digital Audio Broadcasting (DAB) system and utilizes an OFDM transmission technique. The T-DMB system is used for smoothly receiving broadcasting signals in poor environments, e.g., downtown surrounded by high buildings, express highway, etc.

A T-DMB receiver utilizes a differential detection technique for demodulation. A coherent detection technique was recently proposed for improving reception performance. Channel equalization for coherent detection is performed in a frequency domain using a one-tap equalizer. A tap coefficient of the equalizer can be obtained by estimating a reception channel and calculating a reciprocal of the estimated channel coefficient. The reciprocal of the estimated channel coefficient may become very large in a deep fading channel even though the channel estimation is accurately performed. This may cause noise amplification in a channel equalization procedure.

Noise component remaining after the channel estimation serves as a factor that degrades a reception performance of the T-DMB receiver. The T-DMB receiver performs the channel estimation using a known symbol, called a pilot. The channel estimation is achieved by a pilot signal extraction and channel coefficient estimation. The channel estimation performance is determined by noise component remaining in the channel coefficient estimated in association with SNR. Thus, it is very important to reduce the remaining noise component.

Figure 1:
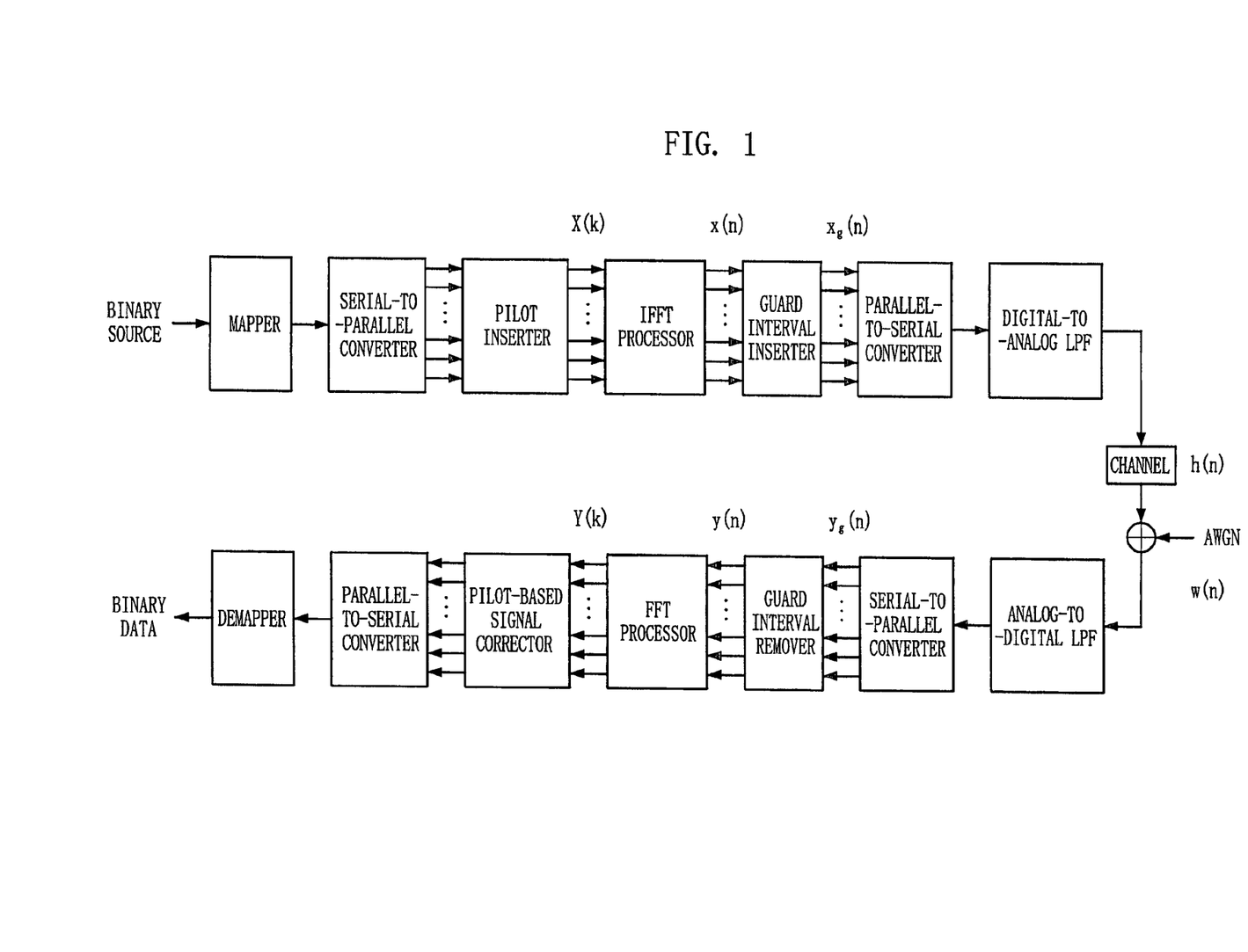
FIG. 1 illustrates a baseband configuration of a typical T-DMB system.

A baseband configuration of a T-DMB system will be described below with reference to FIG. 1. An OFDM transmitter groups and maps binary bits in accordance with a modulation scheme. After pilot insertion, the modulated data is transmitted to an Inverse Fast Fourier Transform (IFFT) block and then converted into a time-domain signal. By copying a portion of the end of the OFDM symbol, a guard interval is inserted for eliminating inter-symbol interference (ISI).

The generated OFDM signal is transmitted over a frequency selective fading channel with Additive White Gaussian Noise (AWGN). An OFDM receiver removes the guard interval from a received signal and performs an FFT operation to obtain a frequency-domain signal.

Figure 2:
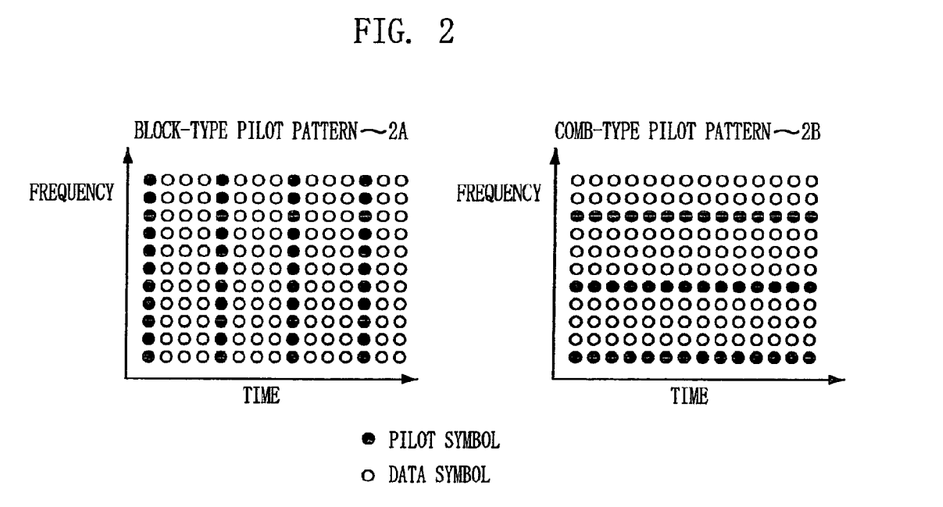
FIG. 2 illustrates a pilot insertion pattern in a typical OFDM system.
Figure 3:
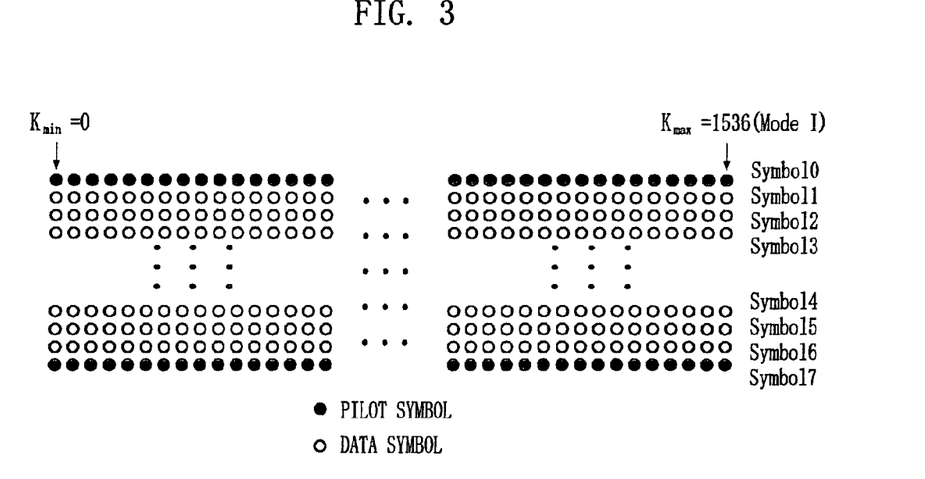
FIG. 3 illustrates a pilot pattern in a typical T-DMB system.

In the OFDM-based communication system, the transmitter inserts a pilot known to the receiver in order for channel estimation, and the receiver estimates a channel using the pilot inserted by the transmitter and compensates for channel distortion. As illustrated in FIG. 2, the inserted pilot signal may be classified into a block-type pilot pattern 2A and a comb-type pilot pattern 2B according to pilot arrangement. The T-DMB system utilizes the block-type pilot pattern 2A. As illustrated in FIG. 3, a pilot block is inserted at the same positions in every 76 OFDM symbols.

Referring to FIG. 2, since the pilot symbols in the block-type pilot pattern 2A are inserted into the entire OFDM symbols at regular time intervals, the block-type pilot pattern 2A is suitable for slow-fading channel estimation. The block-type pilot pattern 2A is used in the T-DMB system. The channel estimation is carried out by applying a Least Squares (LS) or Minimum Mean Square Error (MMSE) method to a corresponding frequency-domain channel coefficient in the pilot-inserted OFDM symbols.

Since the pilot symbols in the comb-type pilot pattern 2B are inserted into all OFDM symbols, the comb-type pilot pattern 2B is suitable for fast-fading channel estimation. The comb-type pilot pattern 2B is used in the DVB-T system. However, since the pilots in the comb-type pilot pattern 2B are inserted into one OFDM symbol at regular frequency intervals, the channel estimation using the pilots is impossible in a data interval between the pilots.

In order to estimate the channel coefficient in the data interval, an interpolation method is carried out to estimate a coefficient value corresponding to a subcarrier frequency between adjacent pilots using the channel coefficient value estimated through an LS or MMSE method. Thus, the channel estimation performance of the OFDM system with the comb-type pilot pattern 2B is different according to the interpolation method. Linear interpolation, Lagrange interpolation, cubic interpolation, Spline interpolation, and Gaussian interpolation are generally used.

A conventional LS estimation method, which is most widely used for the channel estimation in the OFDM system, will be described below with reference to FIGS. 4 to 7.

Figure 4:
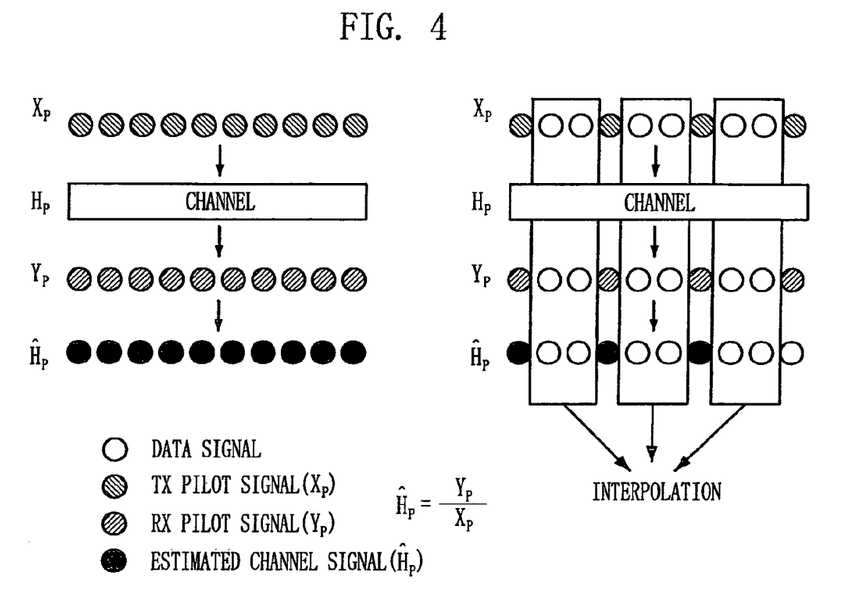
FIG. 4 illustrates LS channel estimation according to a typical pilot insertion pattern.
Figure 5:
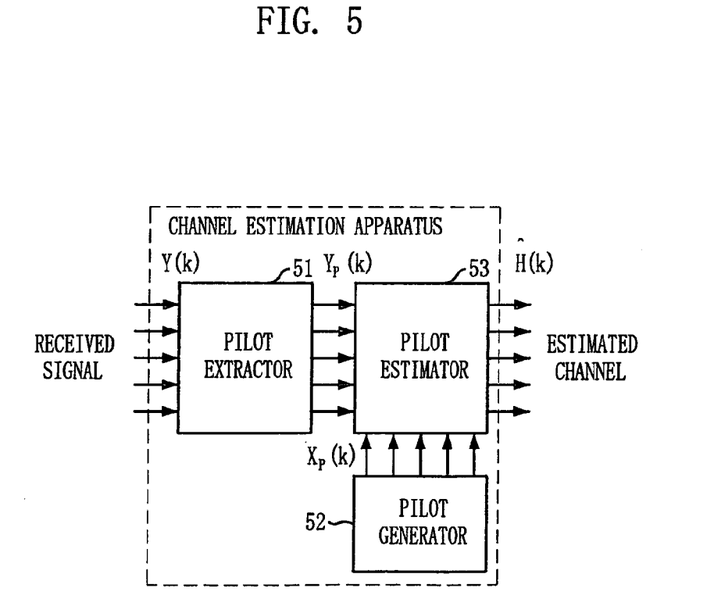
FIG. 5 is a block diagram illustrating a conventional channel estimation apparatus in a block-type pilot pattern.
Figure 6:
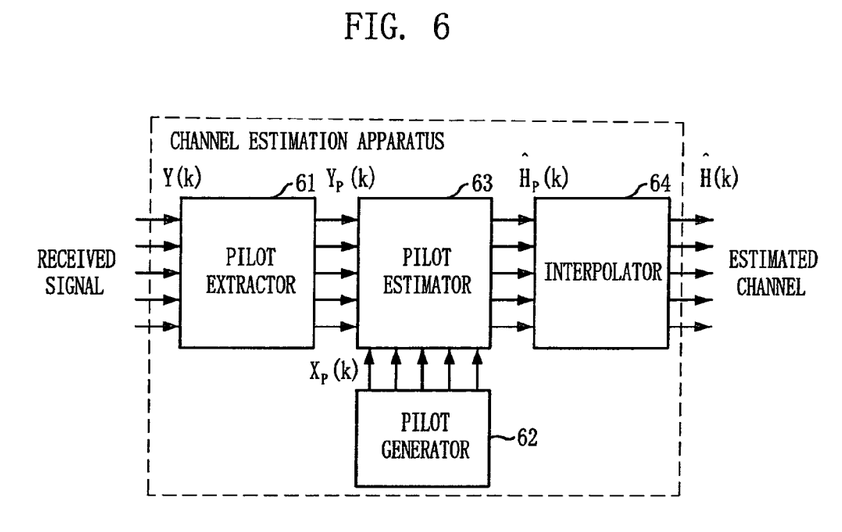
FIG. 6 is a block diagram illustrating a conventional channel estimation apparatus in a comb-type pilot pattern.
Figure 7:
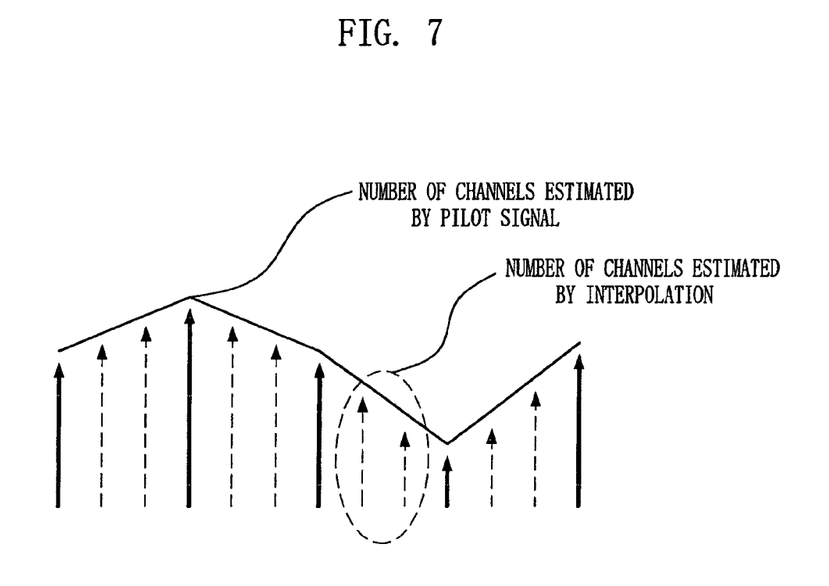
FIG. 7 illustrates a conventional interpolation channel estimation in a comb-type pilot pattern.

FIG. 4 illustrates an LS channel estimation according to a pilot insertion pattern, and FIG. 5 illustrates a block diagram of a conventional channel estimation apparatus in a block-type pilot pattern. FIG. 6 illustrates a block diagram of a conventional channel estimation apparatus in a comb-type pilot pattern, and FIG. 7 illustrates a conventional interpolation channel estimation in a comb-type pilot pattern.

Referring to FIG. 5, which shows the channel estimation in the block-type pilot pattern 2A, a pilot extractor 51 extracts a pilot signal $Y_P$ from a received signal Y, a pilot generator 52 generates a known pilot signal $X_P$, and a pilot estimator 53 estimates a channel coefficient
$\hat{H}$
using the extracted pilot signal $Y_P$ and the generated pilot signal $X_P$, based on an LS method expressed as Eq. 1 below.

MathFigure 1

$$\hat{H} = [\hat{H}(0)\hat{H}(1) \ldots \hat{H}(N-1)]^T \qquad \text{[Math. 1]}$$
$$= \left[\frac{Y_P(0)}{X_P(0)} \frac{Y_P(1)}{X_P(1)} \ldots \frac{Y_P(N-1)}{X_P(N-1)}\right]^T$$

where $\hat{H}(=[\hat{H}(0)\hat{H}(1)\ldots\hat{H}(N-1)]^T)$ is the estimated channel;

$X_P(=[X_P(0)X_P(1)\ldots X_P(N-1)]^T)$ is the pilot signal known to the transmitter and the receiver;

$Y_P(=[Y_P(0)Y_P(1)\ldots Y_P(N-1)]^T$ is the pilot signal extracted from the received signal;

N represents the number of subcarriers of the OFDM symbol; and

T represents a transpose.

Referring to FIGS. 6 and 7, which show the channel estimation in the comb-type pilot pattern 2B, a pilot extractor 61 extracts a pilot signal $Y_P$ from a received signal Y, a pilot generator 62 generates a known pilot signal $X_P$, and a pilot estimator 63 estimates a channel coefficient
$\hat{H}_P$
using the extracted pilot signal $Y_P$ and the generated pilot signal $X_P$, based on an LS method expressed as Eq. 2 below. An interpolator 64 estimates a channel coefficient $\hat{H}$ of a received channel containing a channel coefficient of a subcarrier on which data is loaded.

MathFigure 2

$$\hat{H}_P = [\hat{H}_P(0)\hat{H}_P(1) \ldots \hat{H}_P(N_P-1)]^T \qquad \text{[Math. 2]}$$
$$= \left[\frac{Y_P(0)}{X_P(0)} \frac{Y_P(1)}{X_P(1)} \ldots \frac{Y_P(N_P-1)}{X_P(N_P-1)}\right]^T$$

where $\hat{H}_P(=[\hat{H}_P(0)\hat{H}_P(1)\ldots\hat{H}_P(N_P-1)]^T)$ is the estimated channel;

$X_P(=[X_P(0)X_P(1)\ldots X_P(N_P-1)]^T)$ is the pilot signal known to the transmitter and the receiver;

$Y_P(=[Y_P(0)Y_P(1)\ldots Y_P(N_P-1)]^T$ is the pilot signal extracted from the received signal;

$N_P$ represents the number of subcarriers, on which data is loaded, among N subcarriers of the OFDM symbol; and T represents a transpose.

Generally, the OFDM system utilizes the one-tap equalizer in the frequency domain in order for channel equalization, and the tap coefficient of the equalizer is obtained using the reciprocal of the frequency domain of the estimated channel coefficient $\hat{H}$. Thus, the channel equalization performance is directly influenced by the channel estimation performance.

However, if a deep fading exists in the received channel, the coefficient value for channel equalization becomes very large even though the channel estimation is accurately performed. This may cause noise amplification in the channel equalization procedure. Further, noise component always remains in the estimated channel, and such a noise component may degrade the performance of the equalizer.

Consequently, there is a need for channel estimation apparatus and method that can prevent noise amplification phenomenon caused by the deep fading channel and reduce noise component remaining in the estimated channel.

DISCLOSURE OF INVENTION

Technical Problem

An embodiment of the present invention is directed to providing a channel estimation apparatus and method for estimating a channel between a transmitter and a receiver from a pilot-inserted OFDM signal and linearly or nonlinearly averaging the estimating channel, thereby preventing the equalizer performance from being degraded by noise component of the estimated channel and noise amplification caused by deep fading.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a channel estimation apparatus of a wireless communication system, which includes: a channel estimation unit configured to estimate a channel coefficient of a channel between a transmitter and a receiver from a pilot-inserted carrier signal according to pilot arrangement; and a linear/nonlinear averaging unit configured to linearly or nonlinearly averaging the estimated channel coefficient, thereby preventing an equalizer performance from being degraded by noise component existing in the channel and noise amplification caused by deep fading.

In accordance with another aspect of the present invention, there is provided a channel estimation method of a wireless communication system, which includes the steps of: a) estimating a channel coefficient of a channel between a transmitter and a receiver from a pilot-inserted carrier signal according to pilot arrangement; and b) linearly or nonlinearly averaging the estimated channel coefficient, thereby preventing an equalizer performance from being degraded by noise component existing in the channel and noise amplification caused by deep fading.

Advantageous Effects

Channel estimation apparatus and method in accordance with embodiments of the present invention can estimate a channel between a transmitter and a receiver from a pilot-inserted OFDM signal and can prevent the equalizer performance from being degraded by noise component of the estimated channel and noise amplification caused by deep fading.

MODE FOR THE INVENTION

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 8:
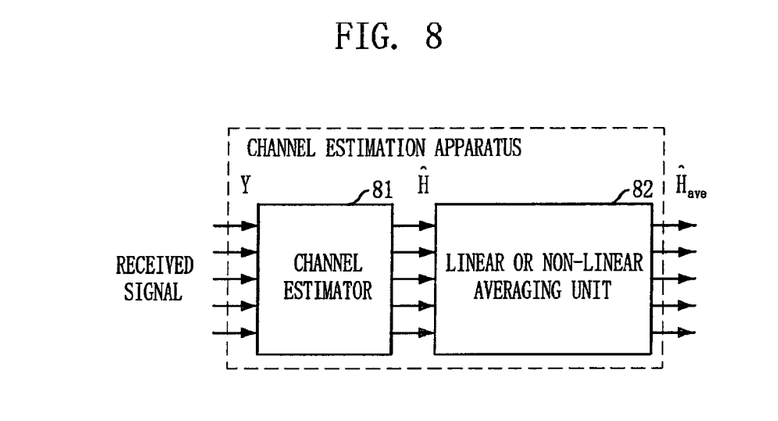
FIG. 8 is a block diagram of a channel estimation apparatus in accordance with an embodiment of the present invention.

FIG. 8 is a block diagram of a channel estimation apparatus in accordance with an embodiment of the present invention.

Referring to FIG. 8, the channel estimation apparatus includes a channel estimation unit 81 and a linear/nonlinear averaging unit 82. The channel estimation unit 81 estimates a channel between a transmitter and a receiver from a pilot-inserted OFDM signal. The linear/nonlinear averaging unit 82 linearly or nonlinearly averages the estimated channel to prevent an equalizer performance from being degraded by noise component of the estimated channel and noise amplification caused by deep null.

More specifically, a channel coefficient $\hat{H}$ of a channel between a transmitter and a receiver is estimated from a pilot-inserted OFDM signal Y, based on an LS method of Eq. 1 or an interpolation method of Eq. 2 according to pilot arrangement. The estimated channel coefficient $\hat{H}$ is linearly or nonlinearly averaged (Fun), as expressed in Eq. 3 below, thereby preventing the equalizer performance from being degraded by noise component of the estimated channel and noise amplification caused by deep fading.

MathFigure 3

$$\hat{H}_{ave} = [\hat{H}_{ave}(0)\hat{H}_{ave}(1) \ldots \hat{H}_{ave}(N-1)]^T \qquad [\text{Math. 3}]$$
$$= Fun\{\hat{H}(0)\hat{H}(1) \ldots \hat{H}(N-1)\}$$

where $\hat{H}(=[\hat{H}(0)\hat{H}(1)\ldots\hat{H}(N-1)]^T)$ is the channel estimated by the channel estimation unit 81;

$\hat{H}_{ave}=[\hat{H}_{ave}(0)\hat{H}_{ave}(1)\ldots\hat{H}_{ave}(N-1)]^T$ is the channel linearly or nonlinearly averaged by the linear/nonlinear averaging unit 82;

N represents the number of subcarriers of an OFDM symbol; and

T represents a transpose.

Examples of the linear/nonlinear averaging (Fun) function include a simple moving average, a weighted moving average, a Piecewise Cubic Hermite Interpolating Polynomial (PCHIP), a Spline interpolation, and a Median filtering. In case of an M-point simple moving average (where M is an odd number), a linearly or nonlinearly averaged channel $H_{ave}$ is expressed as Eq. 4 below.

MathFigure 4

$$\hat{H}_{ave}(i) = \frac{\sum_{j=-(M-1)/2}^{(M-1)/2} \hat{H}(i+j)}{M} \qquad [\text{Math. 4}]$$

Figure 9:
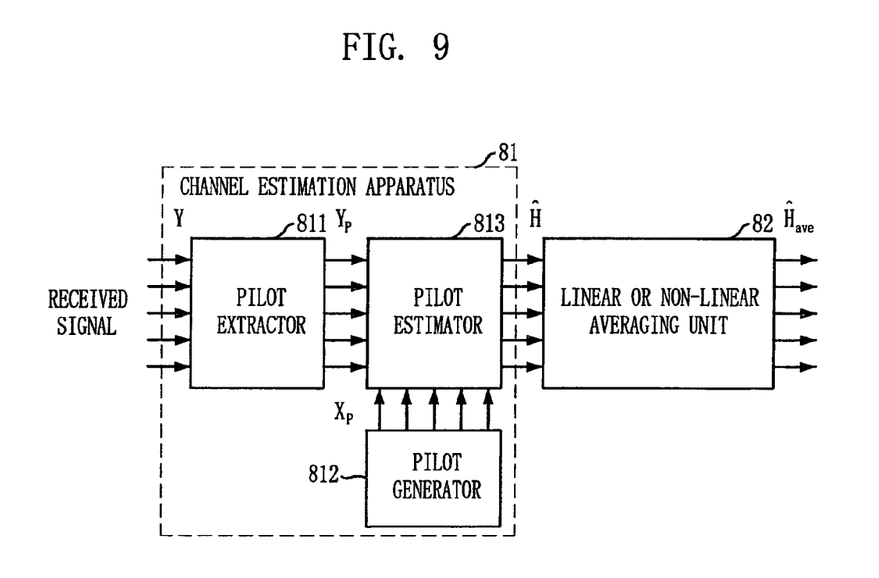
FIG. 9 is a detailed block diagram showing the channel estimation apparatus of FIG. 8.

FIG. 9 is a detailed block diagram showing the channel estimation apparatus of FIG. 8. Referring to FIG. 9, the channel estimation unit 81 includes a pilot extractor 811, a pilot generator 812, and a pilot estimator 813. The pilot extractor 811 extracts a pilot signal from a pilot-inserted OFDM signal. The pilot generator 812 generates a known pilot signal. The pilot estimator 813 estimates a channel coefficient of a channel between a transmitter and a receiver by using the pilot signal extracted by the pilot extractor 811 and the pilot signal generated by the pilot generator 812, based on an LS or MMSE method.

Upon operation of the channel estimation apparatus of FIG. 9, the pilot extractor 811 extracts the pilot signal from the pilot-inserted OFDM signal Y, and the pilot generator 812 generates the pilot signal known to the transmitter and the receiver. Thereafter, the pilot estimator 813 estimates the channel coefficient $\hat{H}$ of the channel between the transmitter and the receiver by using the extracted pilot signal $Y_P$ and the generated pilot signal $X_P$, based on the LS method expressed as Eq. 1. The linear/nonlinear averaging unit 82 linearly or nonlinearly averages the estimated channel, as expressed in Eq. 3, so as to prevent the equalizer performance from being degraded by noise component of the estimated channel coefficient $\hat{H}$ and noise amplification caused by the deep fading.

Figure 10:
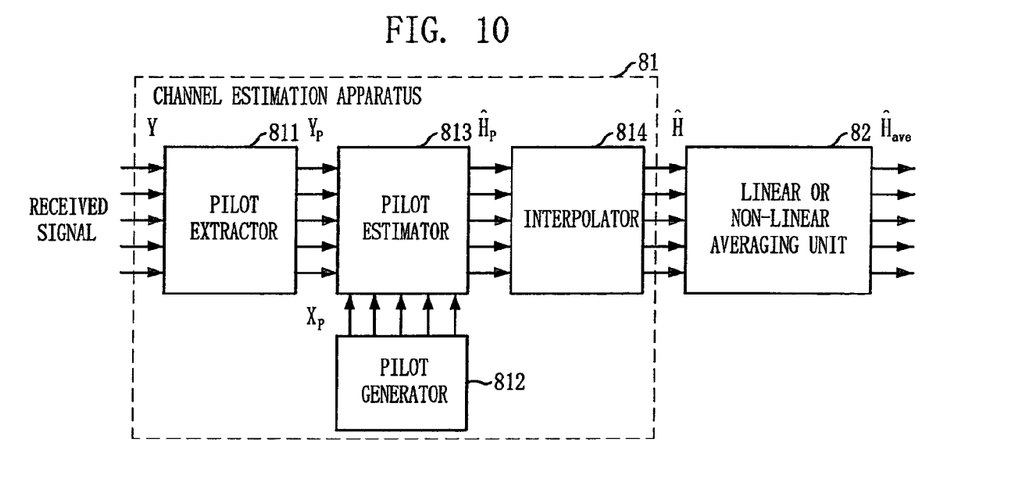
FIG. 10 is a detailed block diagram showing a channel estimation apparatus in accordance with another embodiment of the present invention.

FIG. 10 is a block diagram showing a channel estimation unit in accordance with another embodiment of the present invention. Referring to FIG. 10, the channel estimation unit 81 includes a pilot extractor 811, a pilot generator 812, a pilot estimator 813, and an interpolator 814. The pilot extractor 811 extracts a pilot signal from a pilot-inserted OFDM signal. The pilot generator 812 generates a known pilot signal.

The pilot estimator 813 estimates a channel coefficient of a channel between a transmitter and a receiver by using the pilot signal extracted by the pilot extractor 811 and the pilot signal generated by the pilot generator 812, based on an LS or MMSE method. Using the estimated channel coefficient, the interpolator 814 estimates a channel coefficient of the received channel containing the channel coefficient of a sub-carrier on which data is loaded.

Upon operation of the channel estimation apparatus of FIG. 9, the pilot extractor 811 extracts the pilot signal $Y_P$ from the pilot-inserted OFDM signal Y, and the pilot generator 812 generates the known pilot signal $X_P$. Thereafter, the pilot estimator 813 estimates the channel coefficient
$\hat{H}_P$
of the channel between the transmitter and the receiver by using the pilot signal $Y_P$ extracted by the pilot extractor 811 and the pilot signal $X_P$ generated by the pilot generator 812, based on the MMSE method expressed as Eq. 2.

Using the channel coefficient
$\hat{H}_P$
estimated by the pilot estimator 813, the interpolator 814 estimates a channel coefficient
$\hat{H}$
of the received channel containing a channel coefficient of a subcarrier on which data is loaded. The linear/nonlinear averaging unit 82 linearly or nonlinearly averages the estimated channel, as expressed in Eq. 3, so as to prevent the equalizer performance from being degraded by noise component of the estimated channel coefficient $\hat{H}$
and noise amplification caused by the deep fading.

The following description will be made on a noise reduction method using a weighted moving average, which is used as a linear/nonlinear average (Fun) function by the linear/nonlinear averaging unit 82.

As described above, the channel estimation is very important in the channel equalization, and the channel estimation performance is determined by noise component remaining in the estimated channel coefficient in association with the reception SNR. Further, since the tap coefficient of the equalizer is obtained by calculating a reciprocal of the estimated channel coefficient, the noise amplification phenomenon may occur in the deep fading channel.

Therefore, a remaining noise component must be reduced in order for the accurate channel equalization. Embodiments of the present invention provide a variety of noise reduction methods for reducing noise component remaining the estimated channel coefficient, based on an M-point weighted moving average.
$\hat{H}_A(k)$
defined as a channel coefficient estimated at a k-th pilot frequency of an OFDM symbol after an M-point weighted moving average is expressed as Eq. 5 below.

MathFigure 5

$$\hat{H}_A(k) = \frac{\sum_{j=-(M-1)/2}^{(M-1)/2} C(j) \cdot \hat{H}(k+j)}{M}$$ [Math. 5]

-continued
$$= \frac{\sum_{j=-(M-1)/2}^{(M-1)/2} C(j) \cdot H(k+j)}{M} + \frac{\sum_{j=-(M-1)/2}^{(M-1)/2} C(j) \cdot W(k+j)}{M}$$

where M is an odd number W(k+j) is the noise effect existing at the estimated channel coefficients; and C(j) is a weighting value for a moving average.

In this embodiment, six weighted moving average structures are considered, and weighting values of the respective structures are expressed as Eqs. 6 to 11.

MathFigure 6

$$C(j) = 1, \quad |j| \le \frac{M-1}{2}$$ [Math. 6]

Eq. 6 represents a weighting value for a moving average (MA).

MathFigure 7

$$C(j) = \begin{cases} 0, & j = \arg\min_j |\hat{H}(k+j)| \text{ or } j = \arg\max_j |\hat{H}(k+j)|, \\ 1, & \text{otherwise} \end{cases}$$ [Math. 7]

for $|j| \le \frac{M-1}{2}$

Eq. 7 represents a weighting value for a selective MA.

MathFigure 8

$$C(j) = 1 - \left|\frac{j}{(M+1)/2}\right|, \quad |j| \le \frac{M-1}{2}$$ [Math. 8]

Eq. 8 represents a weighting value for a linear weighted MA.

MathFigure 9

$$C(j) = \begin{cases} -18 \cdot \left|\frac{j}{(M+1)}\right|^2 + 1, & |j| \le \frac{M+1}{6} \\ 9 \cdot \left|\frac{j}{(M+1)}\right|^2 - \frac{15}{2} \cdot \left|\frac{j}{M+1}\right| + \frac{3}{2}, & \frac{M+1}{6} \le |j| < \frac{M+1}{2} \end{cases}$$ [Math. 9]

Eq. 9 represents a weighting value for a quadratic weighted MA.

MathFigure 10

$$C(j) = \begin{cases} 96 \cdot \left|\frac{j}{M+1}\right|^3 - 40 \cdot \left|\frac{j}{M+1}\right|^2 + 1, & |j| < \frac{M+1}{4} \\ -32 \cdot \left|\frac{j}{M+1}\right|^3 + 40 \cdot \left|\frac{j}{M+1}\right|^2 - 16 \cdot \left|\frac{j}{M+1}\right| + 2, \\ \frac{M+1}{4} \le |j| < \frac{M+1}{2} \end{cases}$$ [Math. 10]

Eq. 10 represents a weighting value for a cubic weighted MA.

MathFigure 11

$$C(j) = \begin{cases} 32 \cdot \left|\frac{j}{M+1}\right|^3 - 16 \cdot \left|\frac{j}{M+1}\right|^2 - 2 \cdot \left|\frac{j}{M+1}\right| + 1, & [\text{Math. 11}] \\ |j| < \frac{M+1}{4} \\ -\frac{32}{3} \cdot \left|\frac{j}{M+1}\right|^3 + 16 \cdot \left|\frac{j}{M+1}\right|^2 - \frac{22}{3} \cdot \left|\frac{j}{M+1}\right| + 1, \\ \frac{M+1}{4} \leq |j| < \frac{M+1}{2} \end{cases}$$

Eq. 11 represents a weighting value for a Lagrange weighted MA.

The quadratic weighting value of Eq. 9, the cubic weighting value of Eq. 10, and the Lagrange weighting value of Eq. 11 were derived from a quadratic interpolation filter, a 4-point cubic interpolation filter, and a 4-point Lagrange interpolation filter, respectively. The selective MA is identical to the MA, except that the maximum and minimum values of $\hat{H}(k)$ are excluded.

When the value of M for the MA is sufficiently large in Eq. 5, a noise component $$1/M \cdot \sum_{j=-(M-1)/2}^{(M-1)/2} W(k+j)$$

and a variation $\sigma^2/M$ are small, but the original channel H(k) may be distorted. Thus, the value of M for the MA must be determined considering a trade-off between the noise reduction and the accuracy of the channel estimation. Since the object of the channel estimation apparatus and method in accordance with the embodiment of the present invention is to reduce the noise component in the estimated channel, they can be used regardless of the pilot insertion.

An AWGN channel and a Brazil channel A were used for verifying the proposed channel estimation channel. The Brazil channel A found in a laboratory test in Brazil represents an indoor reception channel condition, and a channel profile is listed in Table 1 below. Further, a T-DMB system used for computer simulation is based on a transmission mode I of a Eureka-147 DAB system having a/4-Differential Quadrature Phase Shift Keying (DQPSK) signal constellation, and system parameters are summarized in Table 2 below.

Table 1

TABLE 1

| Delay (μs) | Amplitude (dB) |
|---|---|
| 0.0 | 0.0 |
| +0.15 | −13.8 |
| +2.22 | −16.2 |
| +3.05 | −14.9 |
| +5.86 | −14.6 |
| +5.93 | −16.4 |

Table 1 shows the multipath profile of the Brazil channel A.

Table 2

TABLE 2

| Parameters | Specifications |
|---|---|
| Number of Carriers | 1536 |
| Carrier Space | 1 KHz |
| OFDM Symbol Duration | 2551 · T (about 1.246 ms) |
| Guard Interval Duration | 504 · T (about 246 μs) |
| Signal constellation | π/4-DQPSK |
| Channel Model | AWGN, Brazil Channel A |

Table 2 shows the multipath profile of the Brazil channel A.

The purpose of this test is to compare the channel estimation performance according to the use of the proposed method. It was assumed that a sync acquisition error and Doppler spread do not exist. No error correction code was used. Further, ISI can be ignored if the guard interval is larger than a maximum delay spread of the channel model. A performance index considered in this embodiment was a symbol error rate (SER) at an output of a one-tap equalizer having a reciprocal of the estimated channel coefficient as a tap coefficient.

Figure 11:
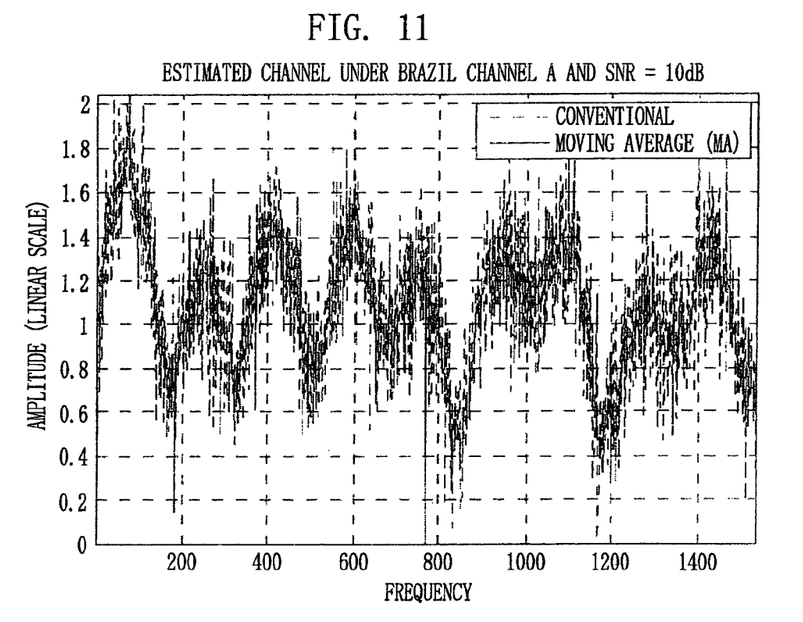
FIGS. 11 and 12 are graphs showing a channel estimation result under Brazil channel A and SNR=10 dB.
Figure 12:
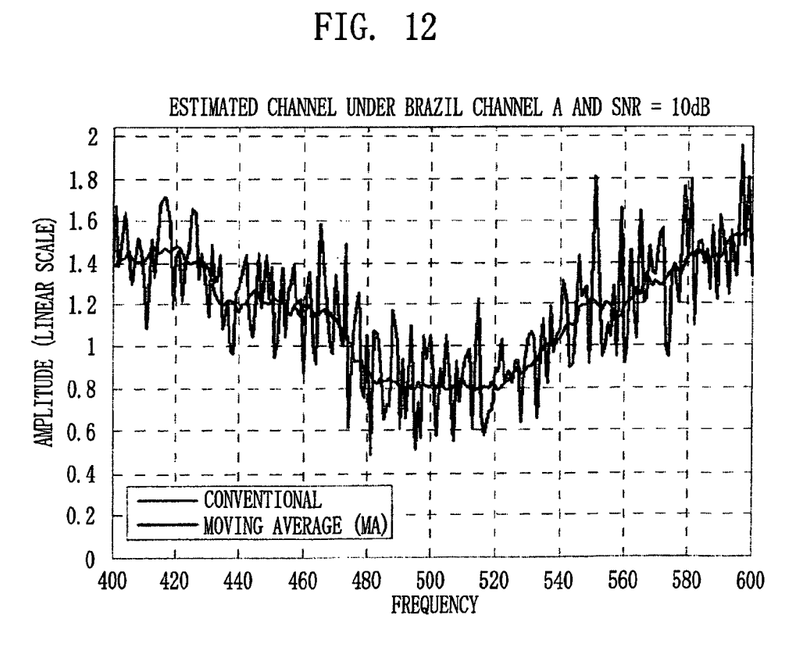

FIGS. 11 and 12 are graphs illustrating a channel estimation result under Brazil channel A and SNR=10 dB. At this point, an 11-point MA method was used for noise reduction.

It can be seen from FIGS. 11 and 12 that noise component remaining after the channel estimation was significantly reduced when the proposed method was applied.

Figure 13:
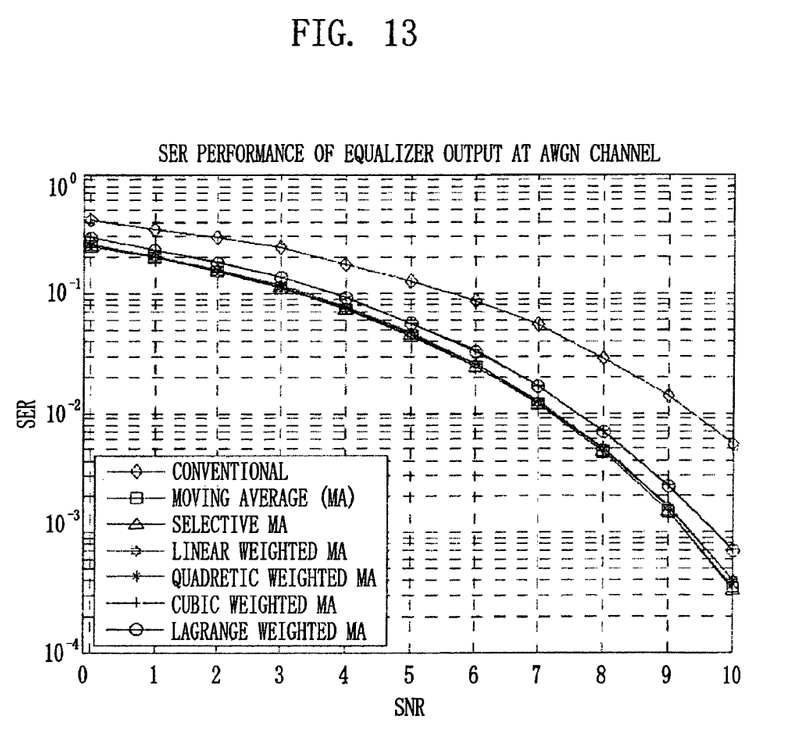
FIG. 13 is a graph illustrating SER performance after equalization at an AWGN channel in accordance with the embodiment of the present invention.
Figure 14:
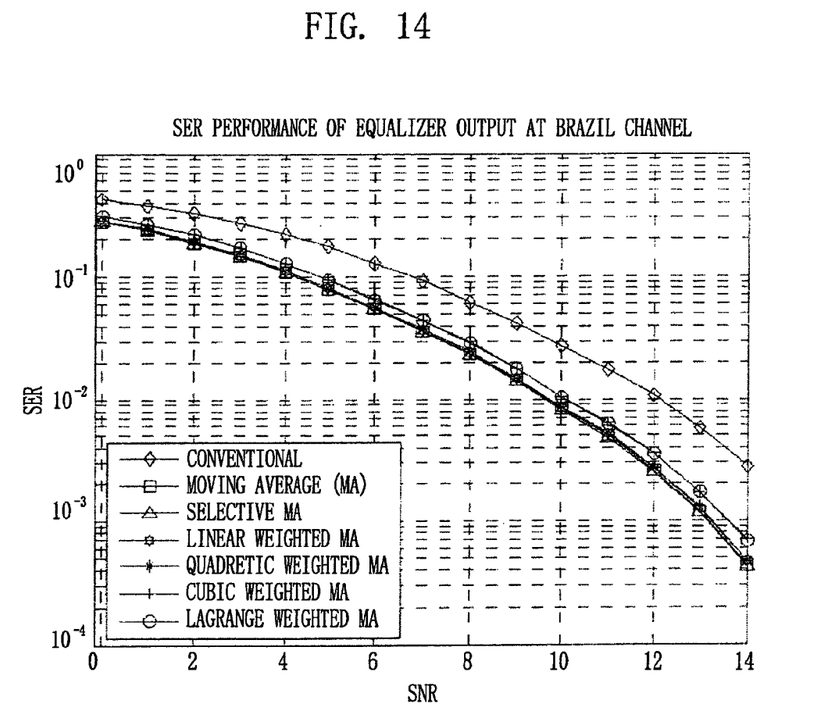
FIG. 14 is a graph illustrating SER performance after equalization at a Brazil channel A in accordance with the embodiment of the present invention.

FIG. 13 is a graph illustrating SER performance after equalization at an AWGN channel, and FIG. 14 is a graph illustrating SER performance after equalization at a Brazil channel A. The proposed channel estimation methods using the 11-point weighted MA exhibited a more excellent performance than the related art by about 2 to 3 dB. The selective MA method exhibited the most excellent performance.

In this embodiment, the noise reduction method uses the M-point weighted MA for improving the channel estimation performance of the T-DMB receiver and its performance was verified by the test. In view of the SER after equalization, the proposed channel estimation method has a more excellent performance than the related art by about 2 to 3 dB. The selective MA method has the most excellent performance. Further, since the proposed channel estimation method is used for reducing the noise component in the estimated channel, it can be used regardless of the pilot insertion.

Although the channel estimation apparatus and method using the linear/nonlinear average in the OFDM system are suitable for broadcasting and communication, they are not limited thereto. The present invention can be applied to any environment requiring the channel estimation apparatus.

As described above, the technology of the present invention can be realized as a program and stored in a computer-readable recording medium, such as CD-ROM, RAM, ROM, floppy disk, hard disk and magneto-optical disk. Since the process can be easily implemented by those skilled in the art of the present invention, further description will not be provided herein.

The present application contains subject matter related to Korean Patent Application Nos. 2006-0110693 and 2006-0125142, filed in the Korean Intellectual Property Office on Nov. 9, 2006, and Dec. 8, 2006, the entire contents of which is incorporated herein by reference.

While the present invention has been described with respect to certain preferred embodiments, it will be apparent to those skilled in the art that various changes and modifications may be made without departing from the scope of the invention as defined in the following claims.

The invention claimed is:

1. A channel estimation apparatus of a wireless communication system, comprising:
   a channel estimation unit configured to estimate a channel coefficient of a channel between a transmitter and a receiver from a pilot-inserted carrier signal according to pilot arrangement; and
   a linear/nonlinear averaging unit linearly or nonlinearly averaging the estimated channel coefficient and preventing an equalizer performance from being degraded by noise component existing in the channel and noise amplification caused by deep fading,
   wherein the linear/nonlinear averaging unit linearly or nonlinearly averages the estimated channel coefficient based on Eq. 1 below, thereby preventing the equalizer performance from being degraded by the noise component existing in the estimated channel and the noise amplification caused by the deep fading $$\hat{H}_{ave} = [\hat{H}_{ave}(0)\hat{H}_{ave}(1) \ldots \hat{H}_{ave}(N-1)]^T \quad \text{Eq. 1}$$
$$= Fun\{\hat{H}(0)\hat{H}(1) \ldots \hat{H}(N-1)\}$$

where $\hat{H}(=[\hat{H}(0)\hat{H}(1) \ldots \hat{H}(N-1)]^T)$ is the channel estimated by the channel estimation unit;
$\hat{H}_{ave}=[\hat{H}_{ave}(0)\hat{H}_{ave}(1) \ldots \hat{H}_{ave}(N-1)]^T$ is the channel linearly or nonlinearly averaged by the linear/nonlinear averaging unit;
N represents the number of subcarriers of an OFDM symbol; and
T represents a transpose.

2. The channel estimation apparatus of claim 1, wherein the carrier signal is a pilot-inserted Orthogonal Frequency Division Multiplexing (OFDM) signal.

3. The channel estimation apparatus of claim 2, wherein the wireless communication system includes a terrestrial digital multimedia broadcasting system using an OFDM modulation scheme.

4. The channel estimation apparatus of claim 1, wherein the linear/nonlinear averaging unit uses one of a simple moving average, a weighted moving average, a Piecewise Cubic Hermite Interpolating Polynomial (PCHIP), a Spline interpolation, and a Median filtering as a linear or nonlinear averaging (Fun) function.

5. The channel estimation apparatus of claim 4, wherein, when the linear/nonlinear averaging unit uses the simple moving average, the linearly or nonlinearly averaged channel ($H_{ave}$) is defined as Eq. 2 below $$\hat{H}_{ave}(i) = \frac{\sum_{j=-(M-1)/2}^{(M-1)/2} \hat{H}(i+j)}{M} \quad \text{Eq. 2}$$

where M is an odd number.

6. The channel estimation apparatus of claim 4, wherein, when the linear/nonlinear averaging unit uses the weighted moving average, a channel coefficient ($\hat{H}_A(k)$) estimated at a k-th pilot frequency of an OFDM symbol after an M-point weighted moving average is defined as Eq. 3 below.

$$\tilde{H}_A(k) = \frac{\sum_{j=-(M-1)/2}^{(M-1)/2} C(j) \cdot \hat{H}(k+j)}{M} \quad \text{Eq. 3}$$

$$= \frac{\sum_{j=-(M-1)/2}^{(M-1)/2} C(j) \cdot H(k+j)}{M} + \frac{\sum_{j=-(M-1)/2}^{(M-1)/2} C(j) \cdot W(k+j)}{M}$$

where M is an odd number; W(k+j) is the noise effect existing at the estimated channel coefficients; and
C(j) is a weighting value for a moving average.

7. The channel estimation apparatus of claim 1, wherein the channel estimation unit includes:
   a pilot extractor configured to extract a pilot signal from a pilot-inserted OFDM signal;
   a pilot generator configured to generate a predetermined pilot signal; and
   a pilot estimator configured to estimate the channel coefficient of the channel between the transmitter and the receiver by using the extracted pilot signal and the generated pilot signal, based on a Least Squares (LS) method.

8. The channel estimation apparatus of claim 1, wherein the channel estimation unit includes:
   a pilot extractor configured to extract a pilot signal from a pilot-inserted OFDM signal;
   a pilot generator configured to generate a predetermined pilot signal;
   a pilot estimator configured to estimate the channel coefficient of the channel between the transmitter and the receiver by using the extracted pilot signal and the generated pilot signal, based on a Minimum Mean Square Error (MMSE) method; and
   an interpolator configured to uses the estimated channel coefficient to estimate a channel coefficient of a received signal containing a channel coefficient of a subcarrier on which data is loaded.

9. A channel estimation method of a wireless communication system, comprising:
   estimating a channel coefficient of a channel between a transmitter and a receiver from a pilot-inserted carrier signal according to pilot arrangement;
   linearly or nonlinearly averaging the estimated channel coefficient; and
   preventing an equalizer performance from being degraded by noise component existing in the channel and noise amplification caused by deep fading,
   wherein the linearly or nonlinearly averaging:
   linearly or nonlinearly averaging the estimated channel coefficient using Eq. 3 below, thereby preventing the equalizer performance from being degraded by the noise component existing in the estimated channel and the noise amplification caused by the deep fading $$\hat{H}_{ave} = [\hat{H}_{ave}(0)\hat{H}_{ave}(1) \ldots \hat{H}_{ave}(N-1)]^T \quad \text{Eq. 3}$$
$$= Fun\{\hat{H}(0)\hat{H}(1) \ldots \hat{H}(N-1)\}$$

where $\hat{H}(=[\hat{H}(0)\hat{H}(1), \ldots \hat{H}(N-1)]^T)$ is the estimated channel,
$\hat{H}_{ave}=[\hat{H}_{ave}(0)\hat{H}_{ave}(1) \ldots \hat{H}_{ave}(N-1)]^T$ is the linearly or nonlinearly averaged channel, N represents the number of subcarriers of an OFDM symbol, and T represents a transpose.

10. The channel estimation method of claim 9, wherein the estimating the channel coefficient includes:
   extracting a pilot signal from a pilot-inserted OFDM signal;
   generating a predetermined pilot signal; and
   estimating the channel coefficient of the channel between the transmitter and the receiver by using the extracted pilot signal and the generated pilot signal, based on a Least Squares (LS) method.

11. The channel estimation method of claim 9, wherein the estimating the channel coefficient includes:
   extracting a pilot signal from a pilot-inserted OFDM signal;
   generating a predetermined pilot signal;
   estimating the channel coefficient of the channel between the transmitter and the receiver by using the extracted pilot signal and the generated pilot signal, based on a Minimum Mean Square Error (MMSE) method; and
   using the estimated channel coefficient to estimate a channel coefficient of a received signal containing a channel coefficient of a subcarrier on which data is loaded.

* * * * *